(12) United States Patent
Kubota et al.

(10) Patent No.: US 8,477,434 B2
(45) Date of Patent: *Jul. 2, 2013

(54) IMAGING LENS

(75) Inventors: Yoji Kubota, Nagano (JP); Kenichi Kubota, Nagano (JP); Hitoshi Hirano, Nagano (JP); Ichiro Kurihara, Tochigi (JP)

(73) Assignee: Optical Logic Inc., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/445,154

(22) Filed: Apr. 12, 2012

(65) Prior Publication Data

US 2012/0200945 A1  Aug. 9, 2012

Related U.S. Application Data

(63) Continuation of application No. PCT/JP2010/068442, filed on Oct. 20, 2010.

(30) Foreign Application Priority Data

Oct. 22, 2009 (JP) .................................. 2009-243049

(51) Int. Cl.
*G02B 9/34* (2006.01)
*G02B 13/18* (2006.01)

(52) U.S. Cl.
USPC .......................................... 359/774; 359/715

(58) Field of Classification Search
USPC ................................................ 359/774, 715
See application file for complete search history.

(56) References Cited

U.S. PATENT DOCUMENTS

| 2008/0186594 A1 | 8/2008 | Jeong et al. |
| 2008/0291553 A1 | 11/2008 | Kim et al. |
| 2012/0229922 A1* | 9/2012 | Kubota et al. ................. 359/774 |

FOREIGN PATENT DOCUMENTS

| JP | 2007-122007 A | 5/2007 |
| JP | 2009-098513 A | 5/2009 |
| JP | 2009-288377 A | 12/2009 |

* cited by examiner

*Primary Examiner* — Scott J Sugarman
(74) *Attorney, Agent, or Firm* — Kubotera & Associates LLC

(57) ABSTRACT

An imaging lens includes a first lens having positive refractive power; a second lens having negative refractive power; a third lens having positive refractive power; and a fourth lens having positive refractive power, arranged from an object side to an image plane side. In the first lens, a curvature radius on an object-side surface is positive and a curvature radius of an image-side surface is negative. In the second lens, curvature radii of an object-side surface and an image-side surface are both positive. In the third lens, curvature radii of an object-side surface and an image-side surface thereof are both negative. When the whole lens system has a focal length f and a distance from the object-side surface of the first lens to an image-side surface of the fourth lens is L14, the imaging lens satisfies the following expression:

$0.5 < L14/f < 0.8$

8 Claims, 12 Drawing Sheets

IMAGING LENS

CROSS-REFERENCE TO RELATED APPLICATIONS

This is a continuation application of the prior PCT application PCT/JP2010/068442, filed on Oct. 20, 2010, pending, which claims priority from a Japanese patent application No. 2009-243049, filed on Oct. 22, 2009, the entire content of which is incorporated herein by reference.

BACKGROUND OF THE INVENTION AND RELATED ART STATEMENT

The present invention relates to an imaging lens for forming an image on an imaging element such as a CCD sensor and a CMOS sensor. In particular, the present invention relates to an imaging lens suitable for mounting in a relatively small camera such as a cellular phone, a digital still camera, a portable information terminal, a security camera, an onboard camera, and a network camera.

An imaging lens for mounting in the above-described small-sized camera is required to have a small size, as well as sufficient optical performances that can be compatible with recent imaging elements with high resolution. Conventionally, when an imaging lens did not have high resolution, it was possible to attain both sufficient optical performances suitable for resolution of the imaging element and miniaturization even with an imaging lens having a two-lens or three-lens configuration. However, as resolution of an imaging lens becomes higher, required optical performances become higher, so that it becomes difficult to attain both sufficient optical performances with satisfactorily corrected aberration and miniaturization.

For this reason, there have been studies in adding another lens, i.e. an imaging lens with a four-lens configuration. For example, an imaging lens described in Patent Reference includes in this order from an object side, a first lens that has a convex shape on the object side and is positive; a second lens that has a shape of a negative meniscus lens directing a concave surface thereof to the object side; a third lens that has a shape of a positive meniscus lens directing a convex surface thereof to the object side; and a fourth lens that has a shape of a positive meniscus lens directing a convex surface thereof to the object side. According to this configuration, satisfactory optical performances are obtained while restraining increase of the total length of the imaging lens by setting preferred ranges for a ratio of a focal length of each of the first to the third lenses to a focal length of the lens system, for refractive index of the first lens, and for Abbe's number of the first lens, and then respectively keeping those values within the ranges.

Patent Reference: Japanese Patent Publication No. 2007-122007

According to the imaging lens described in Patent Reference, it is possible to attain relatively satisfactory aberrations. In each year, however, there have been advancements in miniaturization and performances of devices themselves for mounting the above-described small-sized cameras, so that the size required for such imaging lens has been even smaller than before. In case of the lens configuration described in Patent Reference, it is difficult to attain both miniaturization and satisfactory aberration correction, so as to meet the above-described requirements.

In view of the problems of the conventional techniques described above, an object of the present invention is to provide an imaging lens that can satisfactorily correct aberrations in spite of a small size thereof.

SUMMARY OF THE INVENTION

In order to attain the object described above, according to the present invention, an imaging lens includes a first lens having positive refractive power; a second lens having negative refractive power; a third lens having positive refractive power; and a fourth lens having positive refractive power, arranged in this order from an object side to an image plane side. Furthermore, the first lens is formed in a shape so that a curvature radius of an object-side surface thereof is positive and a curvature radius of an image-side surface thereof is negative. The second lens is formed in a shape so that a curvature radius of an object-side surface thereof and a curvature radius of an image-side surface thereof are both positive. The third lens is formed in a shape so that a curvature radius of an object-side surface thereof and a curvature radius of an image-side surface thereof are both negative. In addition, when a whole lens system has a focal length f, a distance on an optical axis from the object-side surface of the first lens to the image-side surface of the fourth lens is L14, the imaging lens satisfies the following conditional expression (1):

$$0.5 < L14/f < 0.8 \tag{1}$$

Moreover, according to the present invention, an imaging lens includes a first lens having positive refractive power; a second lens having negative refractive power; a third lens having negative refractive power; and a fourth lens having positive refractive power, arranged in this order from an object side to an image plane side. The first lens is formed in a shape so that a curvature radius of an object-side surface thereof is positive and a curvature radius of an image-side surface thereof is negative. The second lens is formed in a shape so that a curvature radius of an object-side surface thereof and a curvature radius of an image-side surface thereof are both positive. The third lens is formed in a shape so that a curvature radius of an object-side surface thereof and a curvature radius of an image-side surface thereof are both negative. In addition, when a whole lens system has a focal length f, a distance on an optical axis from the object-side surface of the first lens to the image-side surface of the fourth lens is L14, the imaging lens satisfies the following conditional expression (1):

$$0.5 < L14/f < 0.8 \tag{1}$$

When the imaging lens with the above configuration satisfies the conditional expression (1), it is possible to reduce a length (thickness) of the imaging lens along the optical axis while satisfactorily correcting an aberration.

In the conditional expression (1), when the value exceeds the upper limit "0.8", the distance on the optical axis from the object-side surface of the first lens to the image-side surface of the fourth lens is long in relative to the focal length, and it is difficult to attain miniaturization of the imaging lens. On the other hand, if the value is less than the lower limit "0.5", although it is advantageous for miniaturization of the imaging lens, the thickness of each lens that composes the imaging lens is extremely thin, so that the fabrication properties and productivity are significantly lowered. In addition, it is difficult to satisfactorily correct aberrations.

When a distance on the optical axis from an image-side surface of the second lens to an object-side surface of the third lens is d23 and a distance on the optical axis from an object-side surface of the second lens to an image-side surface of the fourth lens is L24, the imaging lens having the above-described configuration preferably satisfies the following conditional expression (2):

$$0.3 < d23/L24 < 0.7 \quad (2)$$

When the imaging lens satisfies the conditional expression (2), it is possible to restrain an incident angle of a light beam emitted from the imaging lens to an imaging element within a certain range and restrain field curvature within satisfactory range, while shortening the thickness of the imaging lens. As well known in the art, for light beams that an imaging element can take, a maximum incident angle is set as an incident angle limit in view of an imaging element structure. A light beam outside the range of the maximum incident angle may result in an image with a dark periphery due to a shading phenomenon. For this reason, it is necessary to restrain the incident angle of a light beam emitted from the imaging lens to the imaging element within the certain range.

When the value exceeds the upper limit "0.7", although it is advantageous to restrain an incident angle of a light beam emitted from the imaging lens to an imaging element within a certain range, since effective diameters of the third lens and the fourth lens increase, it is difficult to attain miniaturization of the imaging lens. In addition, since an astigmatic difference increases, it is difficult to obtain a flat image surface. On the other hand, when the value is below the lower limit "0.3", although it is advantageous for miniaturization of the imaging lens, it is difficult to restrain an incident angle of a light beam emitted from the imaging lens to an imaging element within a certain range.

When a composite focal length of the first lens and the second lens is f12 and a composite focal length of the third lens and the fourth lens is f34, the imaging lens having the above-described imaging configuration preferably satisfies the following conditional expression (3):

$$0.1 < f12/f34 < 0.8 \quad (3)$$

When the imaging lens satisfies the conditional expression (3), it is possible to reduce the thickness of the imaging lens and restrain the respective aberrations, which includes off-axis chromatic aberration of magnification, within satisfactory ranges in a well-balanced manner. When the value exceeds the upper limit "0.8", the composite focal length of the first lens and the second lens is long in relative to the composite focal length of the third lens and the fourth lens, and a position of a principal point of the lens system moves to the image plane side, so that it is difficult to attain miniaturization of the imaging lens. Furthermore, an off-axis chromatic aberration of magnification is insufficiently corrected (that of a short wavelength increases in a minus direction in relative to that of a reference wavelength), which makes it difficult to obtain satisfactory imaging performance. On the other hand, when the value is below the lower limit "0.1", the composite focal length of the first lens and the second lens is short in relative to the composite focal length of the third lens and the fourth lens, and refractive power of the lens system concentrates on the first lens and the second lens, so that it is difficult to restrain a spherical aberration and a coma aberration within satisfactory ranges in a well-balanced manner. Moreover, the incident angle of an off-axis light beam emitted from the imaging lens to the imaging element increases, so that it is difficult to restrain an incident angle of a light beam emitted from the imaging lens to the imaging element within a certain range.

The imaging lens having the above-described configuration further preferably satisfies the following conditional expression (3A):

$$0.2 < f12/f34 < 0.6 \quad (3A)$$

When the first lens has Abbe's number vd1 and the second lens has Abbe's number vd2, the imaging lens having the above-described configuration preferably satisfies the following conditional expressions (4) and (5):

$$vd1 > 50 \quad (4)$$

$$vd2 < 30 \quad (5)$$

When the imaging lens satisfies the conditional expressions (4) and (5), it is possible to satisfactorily correct chromatic aberrations. When the Abbe's number of the first lens or the Abbe's number of the second lens is outside the range of the conditional expression (4) or (5), the axial chromatic aberration is insufficiently corrected, and it is difficult to obtain satisfactory imaging performance.

When the third lens has Abbe's number vd3 and the fourth lens has Abbe's number vd4, the imaging lens having the above-described configuration preferably satisfies the following conditional expressions (6) and (7):

$$|vd1 - vd4| < 10 \quad (6)$$

$$|vd2 - vd3| < 10 \quad (7)$$

When the imaging lens satisfies the conditional expressions (6) and (7), it is possible to further satisfactorily correct the axial chromatic aberration and off-axis chromatic aberration of magnification.

Furthermore, in the imaging lens having the above-described configuration, when a material of the first lens and a material of the fourth lens are same and a material of the second lens and a material of the third lens are same, the number of types of materials to compose the imaging lens is only two, so that it is possible to reduce the manufacturing cost of the imaging lens.

According to the imaging lens of the invention, it is possible to attain both miniaturization of the imaging lens and satisfactory aberration correction, and it is possible to provide a small-sized imaging lens with satisfactorily corrected aberrations.

DETAILED DESCRIPTION OF PREFERRED EMBODIMENTS (First Embodiment)

Hereunder, referring to the accompanying drawings, a first embodiment of the present invention will be fully described.

Figure 1:
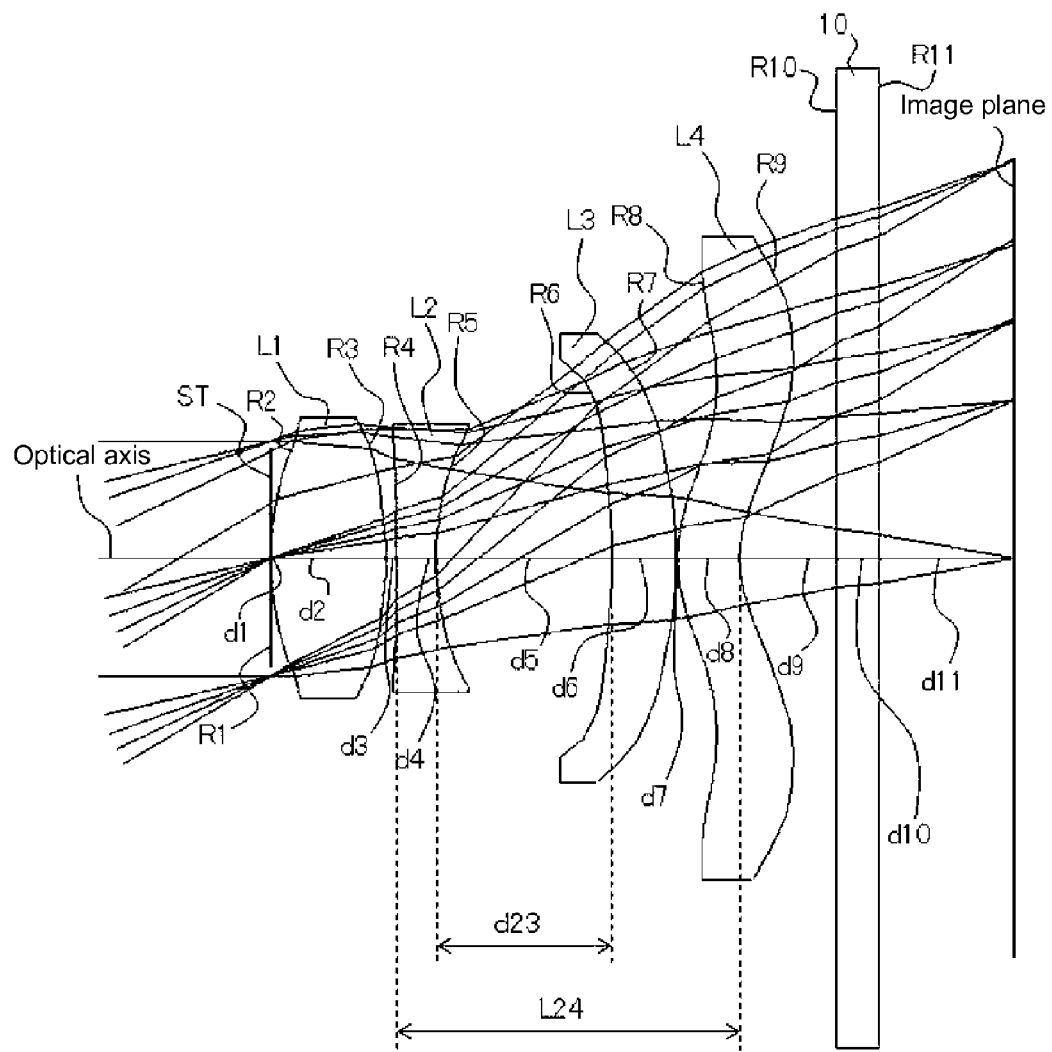
FIG. 1 is a schematic sectional view showing a configuration of an imaging lens in Numerical Data Example 1 according to a first embodiment of the invention.
Figure 4:
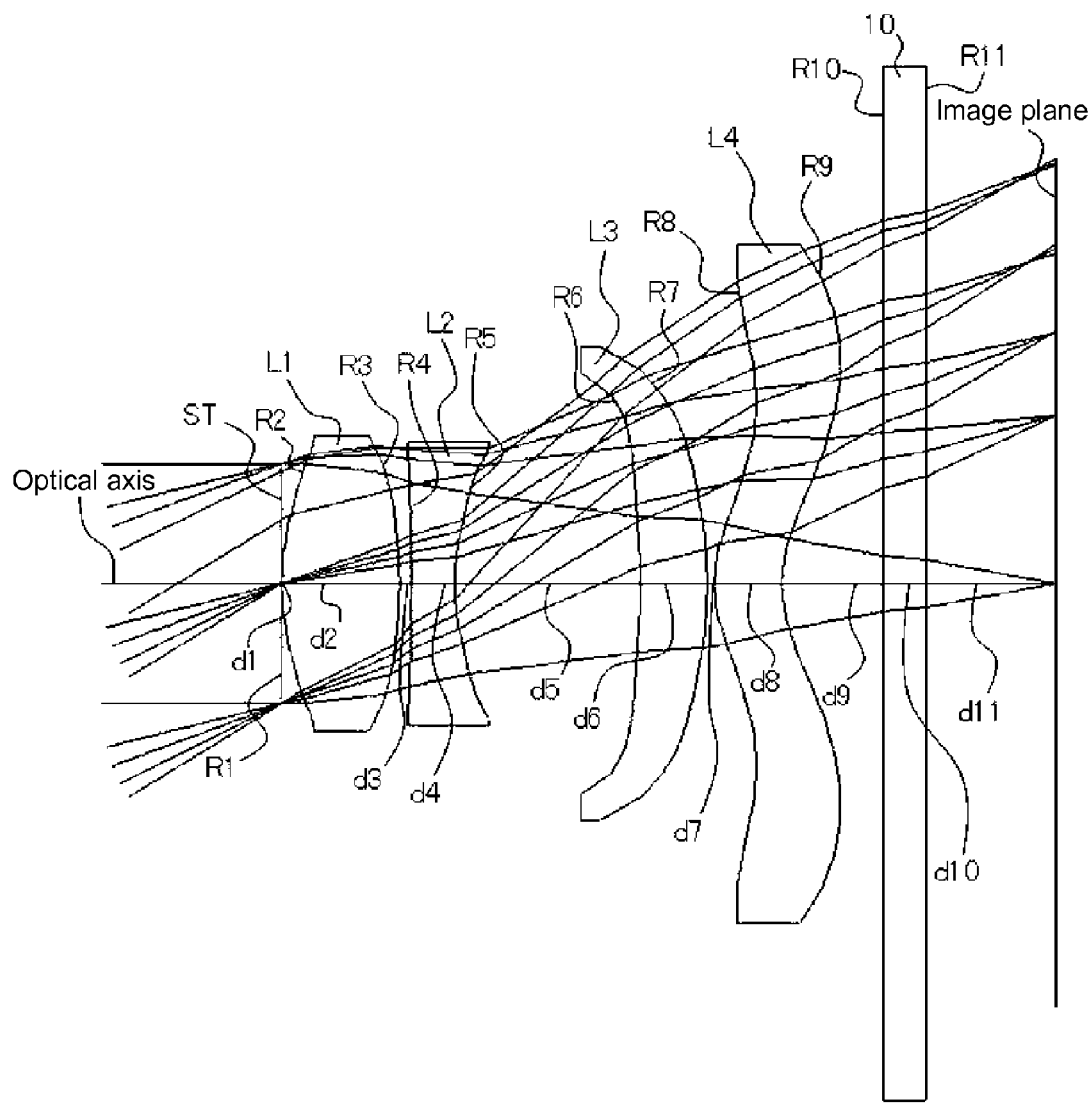
FIG. 4 is a schematic sectional view showing a configuration of an imaging lens in Numerical Data Example 2 according to the first embodiment of the invention.
Figure 7:
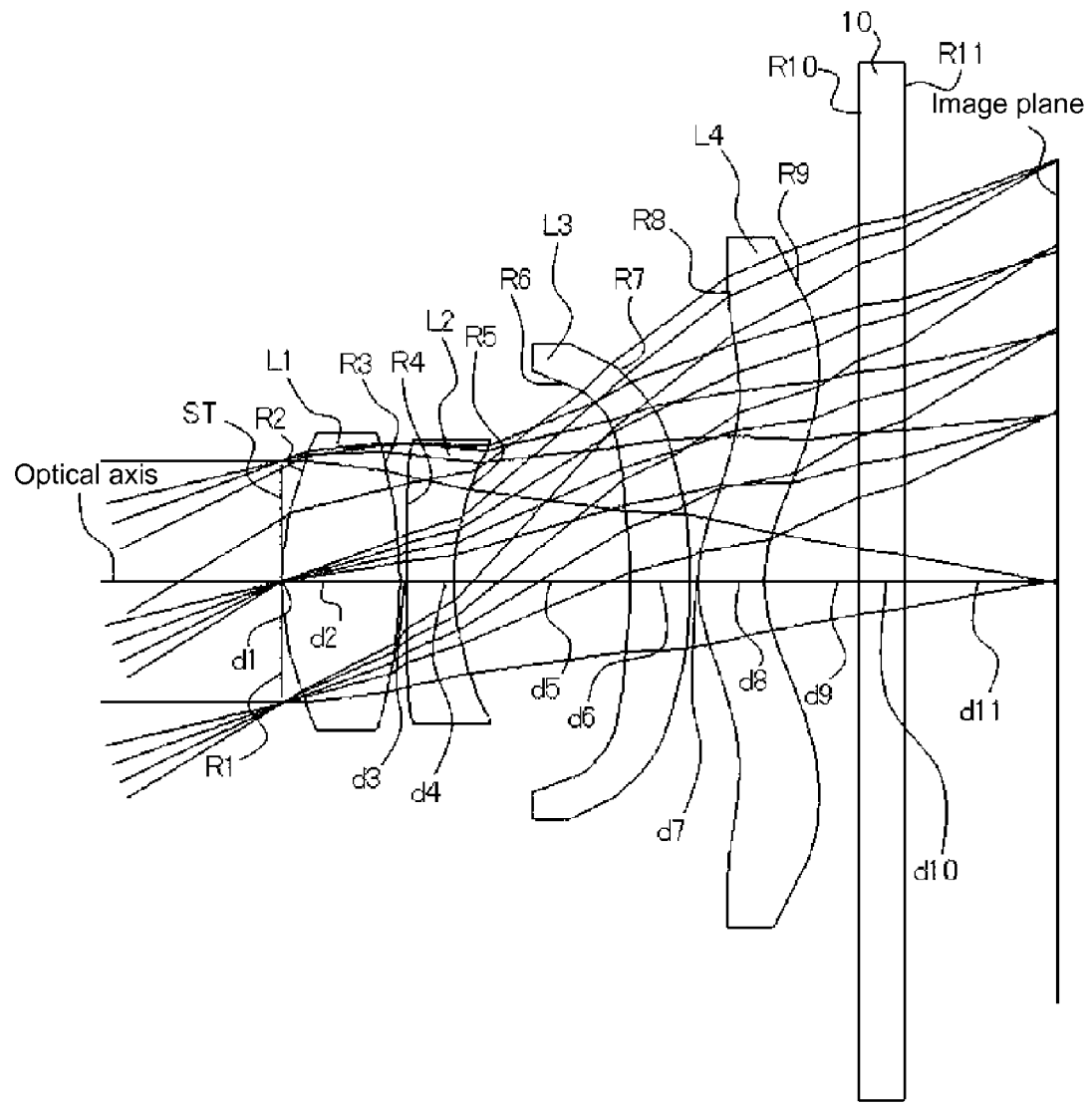
FIG. 7 is a schematic sectional view showing a configuration of an imaging lens in Numerical Data Example 3 according to the first embodiment of the invention.

FIGS. 1, 4, and 7 are sectional views of imaging lenses in Numerical Data Examples 1 to 3 according to the embodiment, respectively. Since a basic lens configuration is the same among the Numerical Data Examples, the lens configuration of the embodiment will be described with reference to the lens sectional view of Numerical Data Example 1.

As shown in FIG. 1, the imaging lens of the embodiment has an aperture stop ST; a first lens L1 having positive refractive power; a second lens L2 having negative refractive power; a third lens L3 having positive refractive power; and a fourth lens L4 having positive refractive power, arranged in this order from an object side to an image plane side. A cover glass 10 is provided between the fourth lens L4 and the image plane. Here, the cover glass 10 may be optionally omitted. According to the embodiment, the aperture stop is provided on a tangential plane of a vertex of the object-side surface of the first lens L1. The position of the aperture stop is not limited to the one in this embodiment, and for example, it may be closer to the object-side in relative to the tangential plane of the vertex of the object-side surface of the first lens L1 or between the tangential plane of the vertex and the image-side surface of the first lens L1.

According to the imaging lens having the above-described configuration, the first lens L1 is formed in a shape so that a curvature radius R2 of an object-side surface thereof is positive and a curvature radius R3 of an image-side surface thereof is negative, i.e. a shape of a biconvex lens near the optical axis. The second lens L2 is formed in a shape so that a curvature radius R4 of an object-side surface thereof and a curvature radius R5 of an image-side surface thereof are both positive, and has a shape of a meniscus lens directing a convex surface thereof to the object side near the optical axis.

The third lens L3 is formed in a shape so that a curvature radius R6 of an object-side surface thereof and a curvature radius R7 of an image-side surface thereof are both negative and has a shape of a meniscus lens directing a concave surface thereof to the object side near the optical axis. The fourth lens L4 is formed in a shape so that a curvature radius R8 of an object-side surface thereof and a curvature radius R9 of an image-side surface thereof are both positive and has a shape of a meniscus lens directing a convex surface to the object side near the optical axis.

Furthermore, an image-side surface of the fourth lens L4 is formed as an aspheric shape so that it has a convex shape on the object side near the optical axis and a concave shape on the object side in the periphery. With the fourth lens L4 having such shape, it is possible to suitably restrain an incident angle of a light beam emitted from the imaging lens to the image plane.

According to the imaging lens of this embodiment, a material of the first lens L1 and a material of the fourth lens L4 are same. Therefore, it is possible to suitably reduce the manufacturing cost in comparison with a case of making each of the first lens L1 to the fourth lens L4 from different materials.

The imaging lens according to this embodiment satisfies the following conditional expressions (1) to (3) and (3A). Therefore, according to the imaging lens of this embodiment, it is possible to attain both miniaturization of the imaging lens and satisfactory aberration correction.

$$0.5 < L14/f < 0.8 \quad (1)$$

$$0.3 < d23/L24 < 0.7 \quad (2)$$

$$0.1 < f12/f34 < 0.8 \quad (3)$$

$$0.2 < f12/f34 < 0.6 \quad (3A)$$

In the above conditional expressions, f: Focal length of the whole lens system

L14: Distance on an optical axis from an object-side surface of the first lens L1 to an image-side surface of the fourth lens L4 d23: Distance on the optical axis from an image-side surface of the second lens L2 to an object-side surface of the third lens L3

L24: Distance on the optical axis from an object-side surface of the second lens L2 to an image-side surface of the fourth lens L4 f12: Composite focal length of the first lens L1 and the second lens L2 f34: Composite focal length between the third lens L3 and the fourth lens L4

Furthermore, in order to satisfactorily correct chromatic aberrations, the imaging lens of this embodiment satisfies the conditional expressions (4) and (5) in addition to the conditional expressions (1) to (3) and (3A):

$$vd1 > 50 \quad (4)$$

$$vd2 < 30 \quad (5)$$

Moreover, the imaging lens of this embodiment also satisfies the following conditional expressions (6) and (7):

$$|vd1 - vd4| < 10 \quad (6)$$

$$|vd2 - vd3| < 10 \quad (7)$$

When the imaging lens satisfies those conditional expressions (6) and (7), it is possible to further satisfactorily correct the axial chromatic aberration and the off-axis chromatic aberration of magnification.

Here, it is not necessary to satisfy all of the conditional expressions (1) to (7). When any single one of the conditional expressions is individually satisfied, it is possible to obtain an effect corresponding to the respective conditional expression.

In the embodiment, each lens has a lens surface that is formed as an aspheric surface as necessary. When the aspheric surfaces applied to the lens surfaces have an axis Z in the optical axis direction, a height H in a direction perpendicular to the optical axis, a conical coefficient k, and aspheric coefficients $A_4, A_6, A_8, A_{10}, A_{12}, A_{14}$, and $A_{16}$, a shape of the aspheric surfaces of the lens surfaces may be expressed as follows (which is the same in a second embodiment that will be described below):

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{[Formula 1]}$$

Next, Numerical Data Examples of the imaging lens of the embodiment will be described. In each of the Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line, and νd represents Abbe's number for the d line, respectively. Here, aspheric surfaces are indicated with surface numbers i affixed with * (asterisk).

The values of the respective conditional expressions are as follows:

L14/f=0.713
d23/L24=0.514
f12/f34=0.359
νd1=56.2
νd2=29.0
|νd1−νd4|=0
|νd2−νd3|=0

Numerical Data Example 1

Basic lens data are shown below.
f = 4.747 mm, Fno = 2.800, ω = 31.17°
Unit: mm
Surface Data

| Surface Number i | R | d | Nd | νd |
|---|---|---|---|---|
| (Object) | ∞ | ∞ | | |
| 1 (Stop) | ∞ | 0.0000 | | |
| 2* | 1.975 | 0.8300 | 1.52470 | 56.2(=νd1) |
| 3* | −3.200 | 0.0800 | | |
| 4* | 234.000 | 0.2830 | 1.58500 | 29.0(=νd2) |
| 5* | 1.800 | 1.2700(=d23) | | |
| 6* | −2.640 | 0.4600 | 1.58500 | 29.0(=νd3) |
| 7* | −2.700 | 0.0100 | | |
| 8* | 0.960 | 0.4500 | 1.52470 | 56.2(=νd4) |
| 9* | 0.878 | 0.7000 | | |
| 10 | ∞ | 0.3030 | 1.51633 | 64.12 |
| 11 | ∞ | 0.9760 | | |
| (Image plane) | ∞ | | | | f12 = 6.090
f34 = 16.987
L14 = 3.383
L24 = 2.473

Aspheric Surface Data

Second Surface k = 1.535051, $A_4$ = −3.584795E−02, $A_6$ = −5.341548E−02, $A_8$ = 2.682726E−02,
$A_{10}$ = −4.659743E−02

Third Surface k = −3.102858E+01, $A_4$ = −7.981545E−02, $A_6$ = −3.753298E−02, $A_8$ = 7.692056E−02,
$A_{10}$ = −5.998601E−02

Fourth Surface k = −9.972116E+39, $A_4$ = −6.158896E−02, $A_6$ = −1.921885E−02, $A_8$ = 1.090468E−01,
$A_{10}$ = −1.855461E−02, $A_{12}$ = −4.523068E−02, $A_{14}$ = 5.157794E−03

Fifth Surface k = −7.153989, $A_4$ = 4.468395E−02, $A_6$ = 1.234487E−02, $A_8$ = 2.658020E−02,
$A_{10}$ = −7.028294E−02, $A_{12}$ = 1.641493E−01, $A_{14}$ = −1.126544E−01

Sixth Surface k = −6.558193E+01, $A_4$ = 6.384066E−02, $A_6$ = −5.601949E−02, $A_8$ = −1.598106E−03,
$A_{10}$ = −1.218430E−03, $A_{12}$ = 9.262790E−05, $A_{14}$ = 2.751785E−03, $A_{16}$ = −1.141513E−03

Seventh Surface k = 6.705719E−01, $A_4$ = 9.609024E−02, $A_6$ = −3.575929E−02, $A_8$ = −1.039675E−02,
$A_{10}$ = 2.556040E−03, $A_{12}$ = 1.189165E−03, $A_{14}$ = 1.056894E−04, $A_{16}$ = −1.310586E−04

Eighth Surface k = −3.914012, $A_4$ = −8.747931E−02, $A_6$ = 2.209240E−03, $A_8$ = 3.555385E−03,
$A_{10}$ = −1.015133E−04, $A_{12}$ = −4.368905E−05, $A_{14}$ = −1.325858E−05, $A_{16}$ = 2.258366E−06

Ninth Surface k = −2.979016, $A_4$ = −1.045592E−01, $A_6$ = 2.583630E−02, $A_8$ = −3.520973E−03,
$A_{10}$ = 5.731589E−06, $A_{12}$ = 4.469465E−05, $A_{14}$ = −1.530316E−06, $A_{16}$ = −1.856164E−07

Accordingly, the imaging lens of this Numerical Data Example 1 satisfies the respective conditional expressions (1) to (7).

In addition, the imaging lens of Numerical Data Example 1 further satisfies the following conditional expressions (8) and (9), so that it is possible to further satisfactorily correct the chromatic aberration:

$$vd1=vd4 \quad (8)$$

$$vd2=vd3 \quad (9)$$

In the imaging lens of Numerical Data Example 1, since a material of the second lens L2 and a material of the third lens L3 are same, the number of types of materials to compose the imaging lens is only two, so that it is possible to further reduce the manufacturing cost of the imaging lens.

Figure 2:
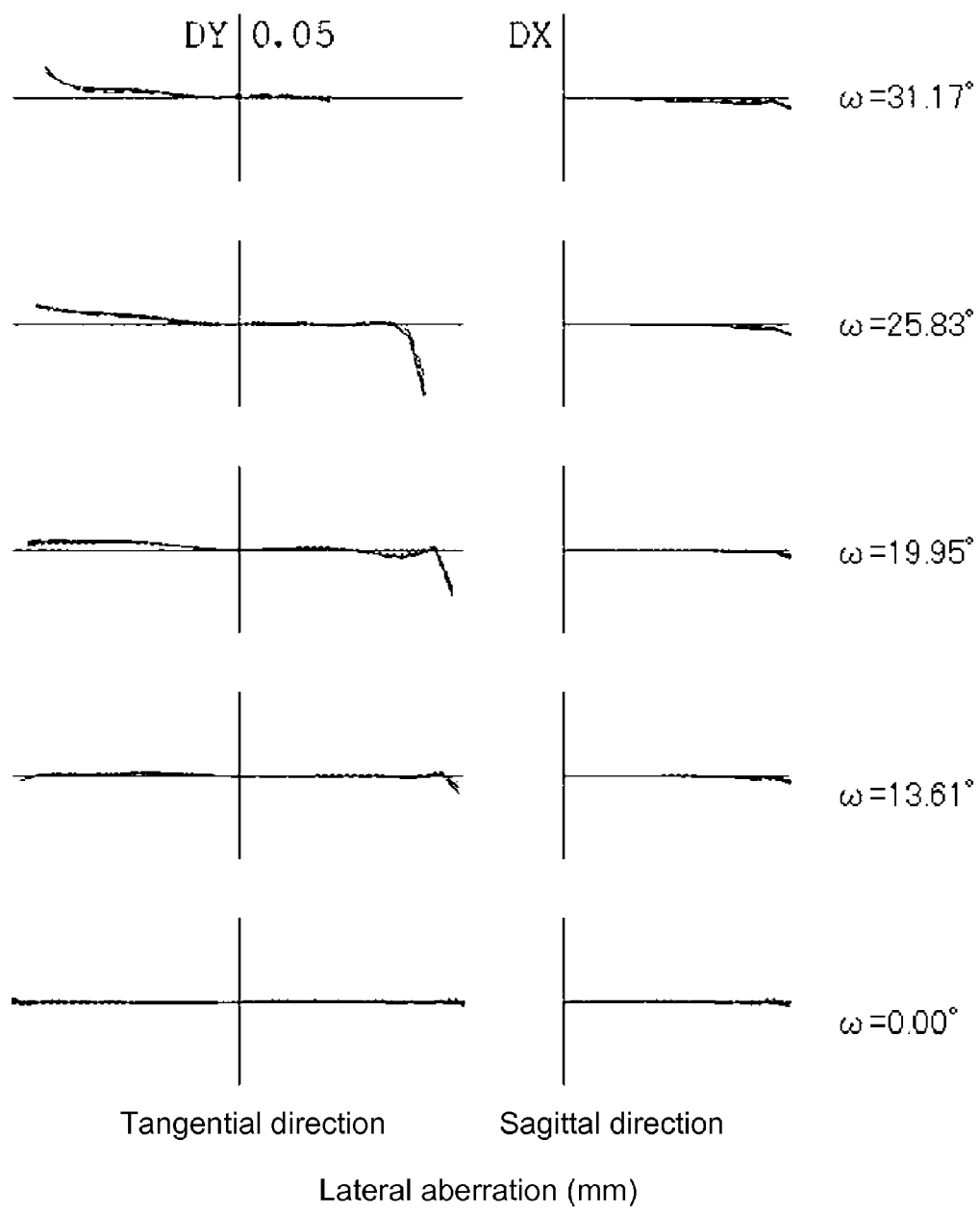
FIG. 2 is an aberration diagram showing a lateral aberration of the imaging lens of Numerical Data Example 1.
Figure 3:
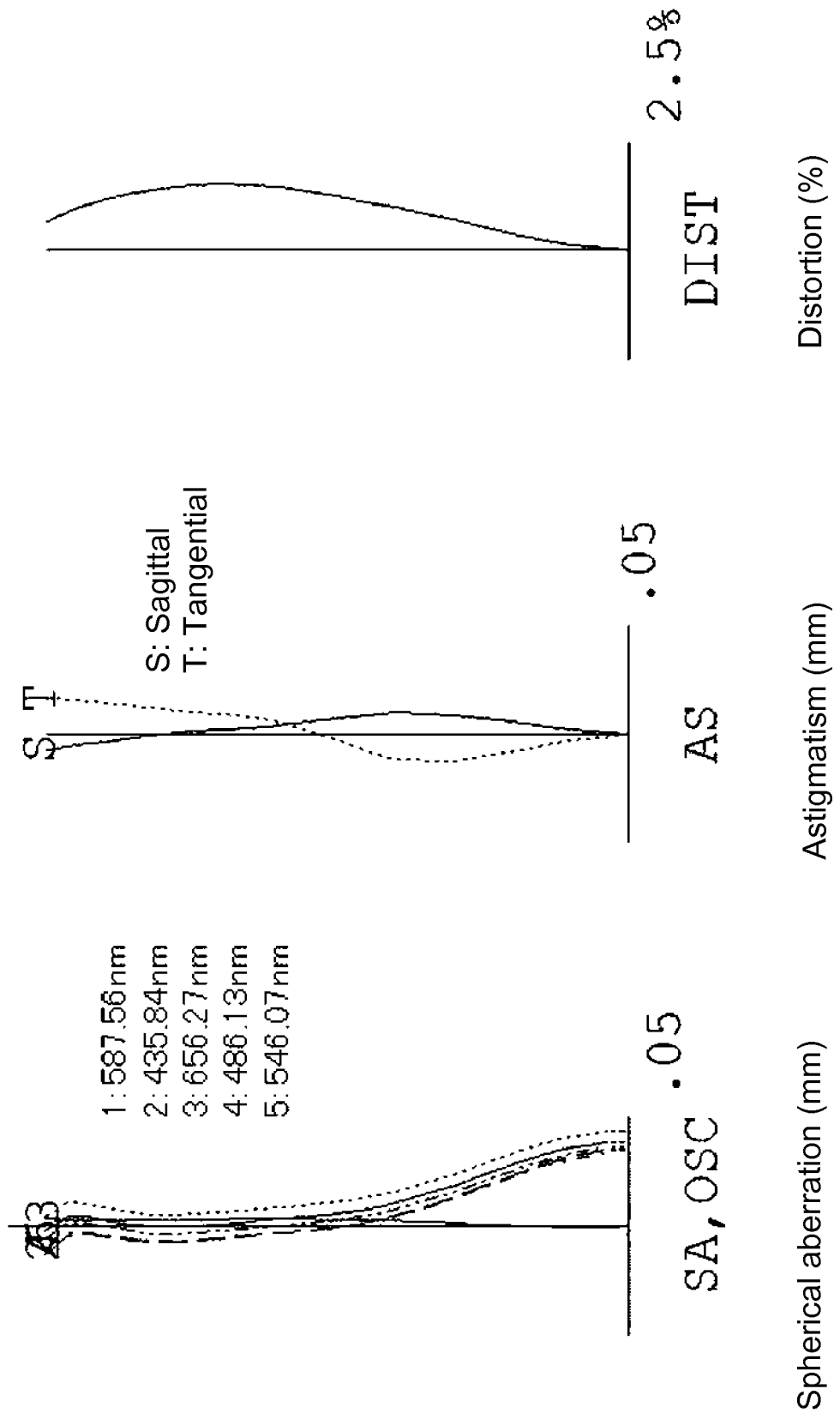
FIG. 3 is an aberration diagram showing a spherical aberration, an astigmatism, and a distortion of the imaging lens of Numerical Data Example 1.
Figure 5:
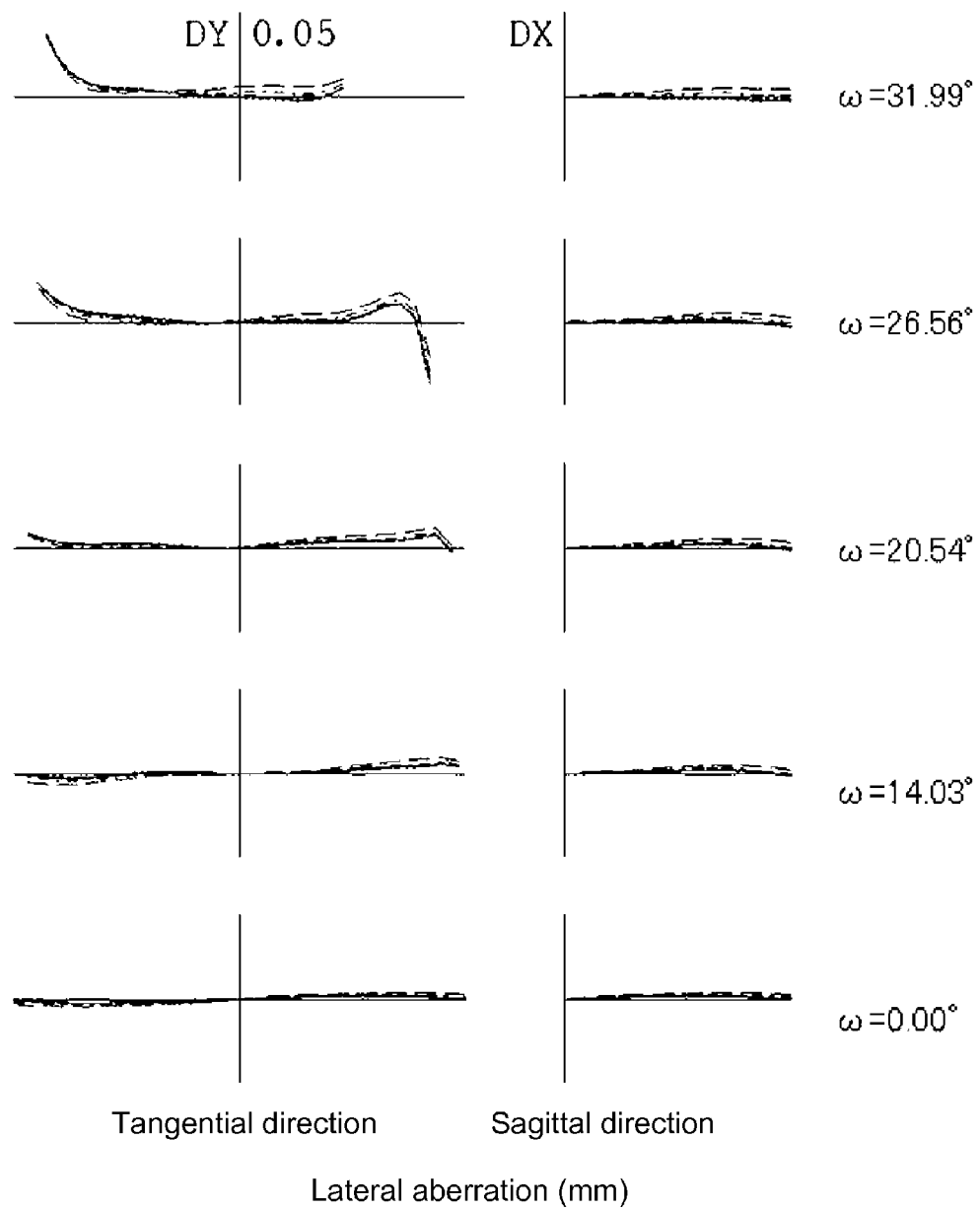
FIG. 5 is an aberration diagram showing a lateral aberration of the imaging lens of Numerical Data Example 2.
Figure 8:
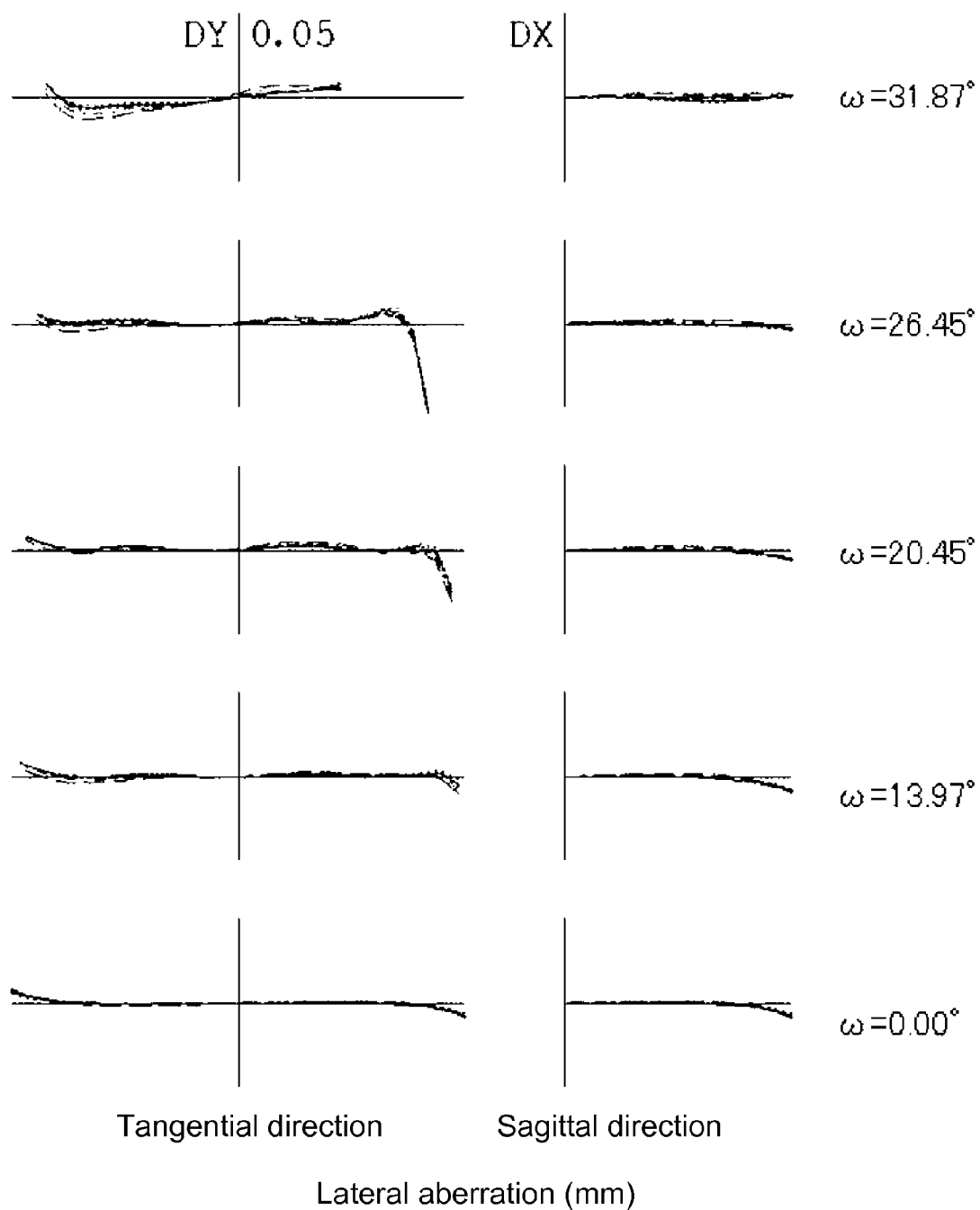
FIG. 8 is an aberration diagram showing a lateral aberration of the imaging lens of Numerical Data Example 3.

FIG. 2 shows the lateral aberration that corresponds to a half angle of view ω in the imaging lens of Numerical Data Example 1 by dividing into a tangential direction and sagittal direction (which is also the same in FIGS. 5 and 8). Furthermore, FIG. 3 shows a spherical aberration SA (mm), an astigmatism AS (mm), and a distortion DIST (%) of the imaging lens of Numerical Data Example 1, respectively. In the aberration diagrams, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagram, the aberration on the sagittal image surface S and the aberration on tangential image surface T are respectively indicated (which are the same in FIGS. 6 and 9). As shown in FIGS. 2 and 3, in the imaging lens of Numerical Data Example 1, each aberration is satisfactorily corrected.

Numerical Data Example 2

Basic lens data are shown below.
f = 4.598 mm, Fno = 2.800, ω = 31.99°
Unit: mm
Surface Data

| Surface Number i | R | d | Nd | vd |
|---|---|---|---|---|
| (Object) | ∞ | ∞ | | |
| 1 (Stop) | ∞ | 0.0000 | | |
| 2* | 1.960 | 0.8000 | 1.52470 | 56.2(=vd1) |
| 3* | −3.140 | 0.0800 | | |
| 4* | 190.000 | 0.3000 | 1.61420 | 26.0(=vd2) |
| 5* | 1.830 | 1.2700(=d23) | | |
| 6* | −2.710 | 0.4500 | 1.58500 | 29.0(=vd3) |
| 7* | −2.580 | 0.0500 | | |
| 8* | 0.937 | 0.4500 | 1.52470 | 56.2(=vd4) |
| 9* | 0.845 | 0.7000 | | |
| 10 | ∞ | 0.3000 | 1.51633 | 64.12 |
| 11 | ∞ | 0.8828 | | |
| (Image plane) | ∞ | | | | f12 = 6.158
f34 = 13.611
L14 = 3.400
L24 = 2.520

Aspheric Surface Data

Second Surface k = 1.523272, $A_4 = -3.674821E-02$, $A_6 = -5.362241E-02$, $A_8 = 2.784044E-02$,
$A_{10} = -4.372975E-02$ Third Surface k = −3.027857E+01, $A_4 = -7.891662E-02$, $A_6 = -3.452228E-02$, $A_8 = 8.056610E-02$,
$A_{10} = -5.732529E-02$ Fourth Surface k = −9.972116E+39, $A_4 = -5.972871E-02$, $A_6 = -1.854560E-02$, $A_8 = 1.097227E-01$,
$A_{10} = -1.673134E-02$, $A_{12} = -4.210460E-02$, $A_{14} = 8.864766E-03$ Fifth Surface k = −7.325117, $A_4 = 4.277749E-02$, $A_6 = 1.014590E-02$, $A_8 = 2.544319E-02$,
$A_{10} = -6.958692E-02$, $A_{12} = 1.667694E-01$, $A_{14} = -1.092939E-01$ Sixth Surface k = −7.444598E+01, $A_4 = 6.562546E-02$, $A_6 = -5.667216E-02$, $A_8 = -1.987852E-03$,
$A_{10} = -1.433377E-03$, $A_{12} = -4.663016E-05$, $A_{14} = 2.676482E-03$, $A_{16} = -1.172270E-03$ Seventh Surface k = 7.784563E−01, $A_4 = 9.590598E-02$, $A_6 = -3.538124E-02$, $A_8 = -1.066958E-02$,
$A_{10} = 2.360861E-03$, $A_{12} = 1.114033E-03$, $A_{14} = 7.983932E-05$, $A_{16} = -1.405408E-04$ -continued Numerical Data Example 2

Eighth Surface k = −3.924204, $A_4$ = −8.876516E−02, $A_6$ = 2.091896E−03, $A_8$ = 3.546330E−03,
$A_{10}$ = −1.020165E−04, $A_{12}$ = −4.365898E−05, $A_{14}$ = −1.324021E−05, $A_{16}$ = 2.262549E−06

Ninth Surface k = −2.967570, $A_4$ = −1.026086E−01, $A_6$ = 2.583143E−02, $A_8$ = −3.530498E−03,
$A_{10}$ = 4.411777E−06, $A_{12}$ = 4.450544E−05, $A_{14}$ = −1.563105E−06, $A_{16}$ = −1.917588E−07

The values of the respective conditional expressions are as follows:
L14/f=0.739
d23/L24=0.504
f12/f34=0.452
vd1=56.2
vd2=26.0
|vd1−vd4|=0
|vd2−vd3|=3

Therefore, the imaging lens in Numerical Data Example 2 satisfies the respective conditional expressions (1) to (7).

Figure 6:
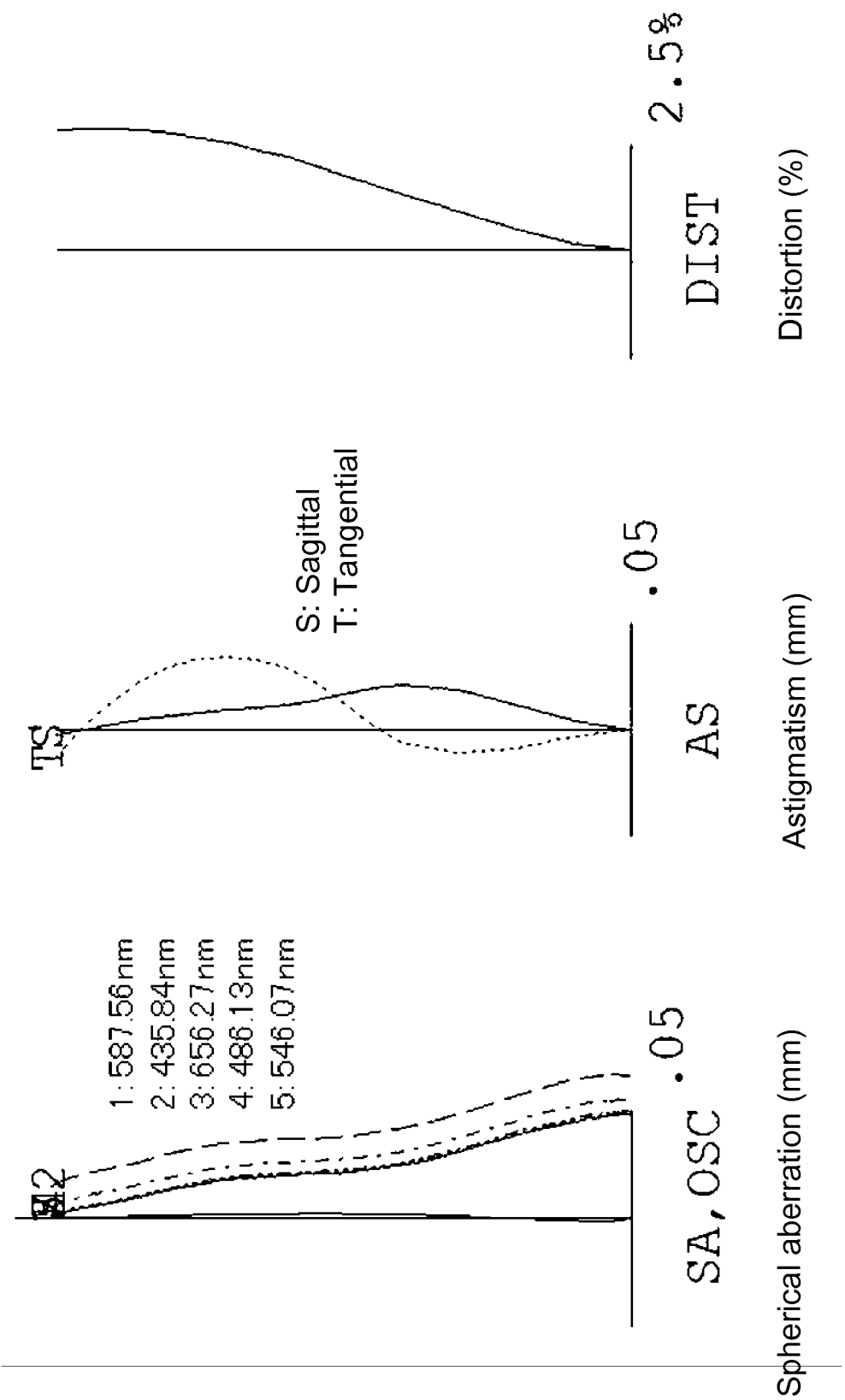
FIG. 6 is an aberration diagram showing a spherical aberration, an astigmatism, and a distortion of the imaging lens of Numerical Data Example 2.

FIG. 5 shows the lateral aberration that corresponds to a half angle of view ω in the imaging lens of Numerical Data Example 2. Furthermore, FIG. 6 shows a spherical aberration SA (mm), an astigmatism AS (mm), and a distortion DIST (%) of the imaging lens, respectively. As shown in FIGS. 5 and 6, in the imaging lens of Numerical Data Example 2, image surface is satisfactorily corrected and each aberration is suitably corrected, similarly to Numerical Data Example 1.

Numerical Data Example 3

Basic lens data are shown below.
f = 4.620 mm, Fno = 2.800, ω = 31.87°
Unit: mm

Surface Data

| Surface Number i | R | d | Nd | vd |
|---|---|---|---|---|
| (Object) | ∞ | ∞ | | |
| 1 (Stop) | ∞ | 0.0000 | | |
| 2* | 2.000 | 0.8000 | 1.52470 | 56.2(=vd1) |
| 3* | −2.970 | 0.0500 | | |
| 4* | 85.000 | 0.3200 | 1.61420 | 26.0(=vd2) |
| 5* | 1.800 | 1.2000(=d23) | | |
| 6* | −2.650 | 0.4100 | 1.58500 | 29.0(=vd3) |
| 7* | −2.580 | 0.0500 | | |
| 8* | 0.970 | 0.4500 | 1.52470 | 56.2(=vd4) |
| 9* | 0.890 | 0.6500 | | |
| 10 | ∞ | 0.3000 | 1.51633 | 64.12 |
| 11 | ∞ | 1.0485 | | |
| (Image plane) | ∞ | | | | f12 = 6.170
f34 = 14.228
L14 = 3.280
L24 = 2.430

Aspheric Surface Data

Second Surface k = 1.569862, $A_4$ = −3.582961E−02, $A_6$ = −5.514193E−02, $A_8$ = 2.111546E−02,
$A_{10}$ = −2.100983E−02

Third Surface k = −3.448672E+01, $A_4$ = −6.360458E−02, $A_6$ = −9.427583E−03, $A_8$ = 9.524746E−02,
$A_{10}$ = −6.873108E−02

Fourth Surface k = 2.982380E+03, $A_4$ = −1.418555E−02, $A_6$ = 2.586552E−03, $A_8$ = 1.130570E−01,
$A_{10}$ = −2.629102E−02, $A_{12}$ = −5.544998E−02, $A_{14}$ = 1.816254E−02

Fifth Surface k = −7.256649, $A_4$ = 5.014734E−02, $A_6$ = 2.040062E−02, $A_8$ = 2.801411E−02,
$A_{10}$ = −7.373615E−02, $A_{12}$ = 1.620376E−01, $A_{14}$ = −1.064979E−01

Sixth Surface k = −5.649491E+01, $A_4$ = 5.512272E−02, $A_6$ = −5.927976E−02, $A_8$ = −3.831064E−03,
$A_{10}$ = −1.920700E−03, $A_{12}$ = 2.760719E−05, $A_{14}$ = 2.590711E−03, $A_{16}$ = −1.484510E−03

-continued

Numerical Data Example 3

Seventh Surface k = 8.337932E−01, $A_4$ = 9.156358E−02, $A_6$ = −3.623063E−02, $A_8$ = −1.090108E−02,
$A_{10}$ = 2.123807E−03, $A_{12}$ = 9.363177E−04, $A_{14}$ = 4.993016E−05, $A_{16}$ = −9.772932E−05
Eighth Surface k = −3.922049, $A_4$ = −8.856960E−02, $A_6$ = 2.891737E−03, $A_8$ = 3.554763E−03,
$A_{10}$ = −1.097780E−04, $A_{12}$ = −4.482765E−05, $A_{14}$ = −1.323961E−05, $A_{16}$ = 2.318158E−06
Ninth Surface k = −3.004436, $A_4$ = −1.045050E−01, $A_6$ = 2.512839E−02, $A_8$ = −3.446471E−03,
$A_{10}$ = 1.329201E−05, $A_{12}$ = 4.482654E−05, $A_{14}$ = −1.526123E−06, $A_{16}$ = −1.704036E−07

The values of the respective conditional expressions are as follows:
L14/f=0.710
d23/L24=0.494
f12/f34=0.434
vd1=56.2
vd2=26.0
|vd1−vd4|=0
|vd2−vd3|=3

Therefore, the imaging lens in Numerical Data Example 3 satisfies the respective conditional expressions (1) to (7).

Figure 9:
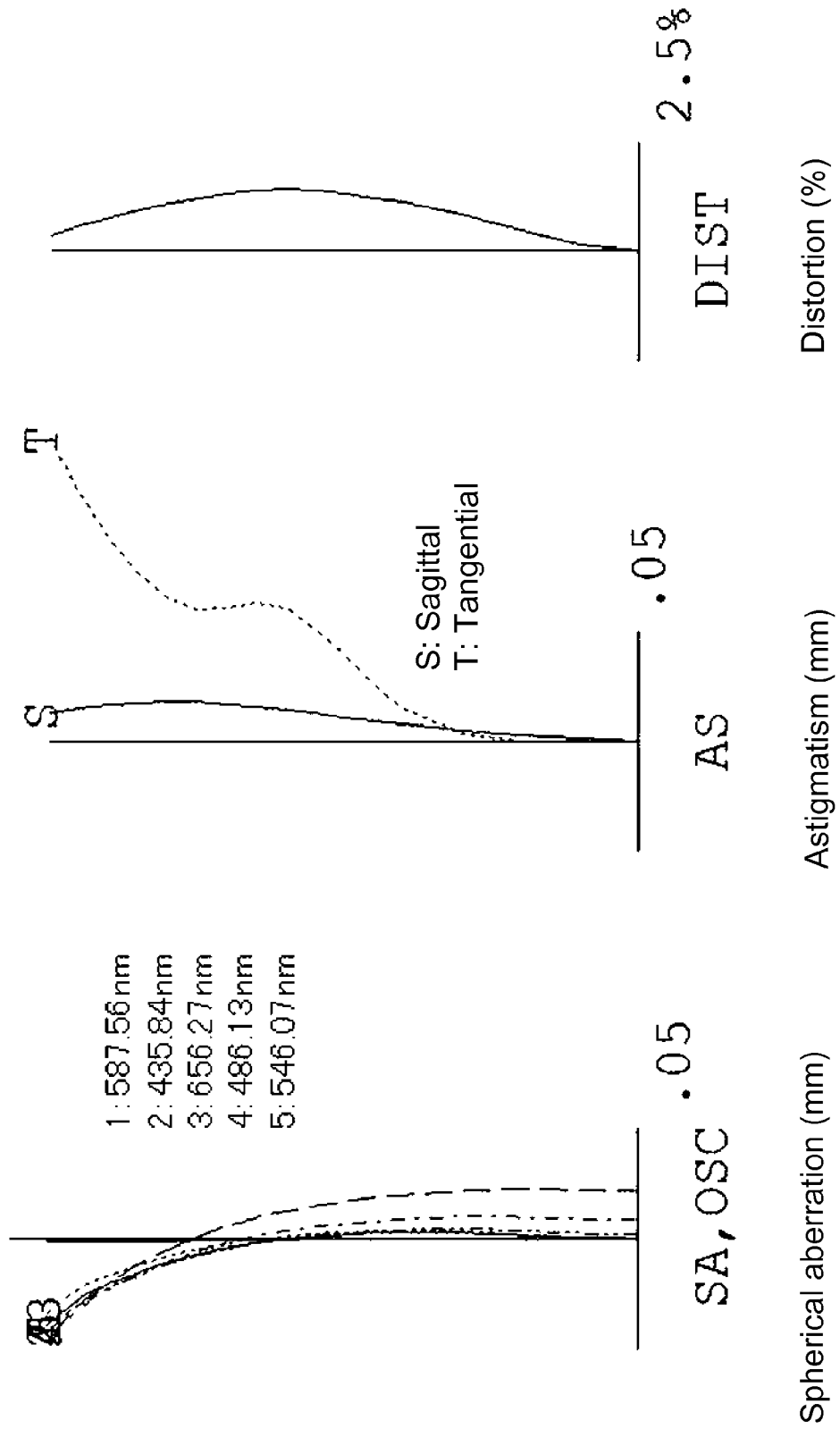
FIG. 9 is an aberration diagram showing a spherical aberration, an astigmatism, and a distortion of the imaging lens of Numerical Data Example 3.

FIG. 8 shows the lateral aberration that corresponds to a half angle of view ω in the imaging lens of Numerical Data Example 3. Furthermore, FIG. 9 shows a spherical aberration SA (mm), an astigmatism AS (mm), and a distortion DIST (%) of the imaging lens, respectively. As shown in FIGS. 8 and 9, in the imaging lens of Numerical Data Example 3, image surface is satisfactorily corrected and each aberration is suitably corrected, similarly to Numerical Data Example 1.

(Second Embodiment)

Next, a second embodiment of the invention will be fully described referring to the accompanying drawings.

Figure 10:
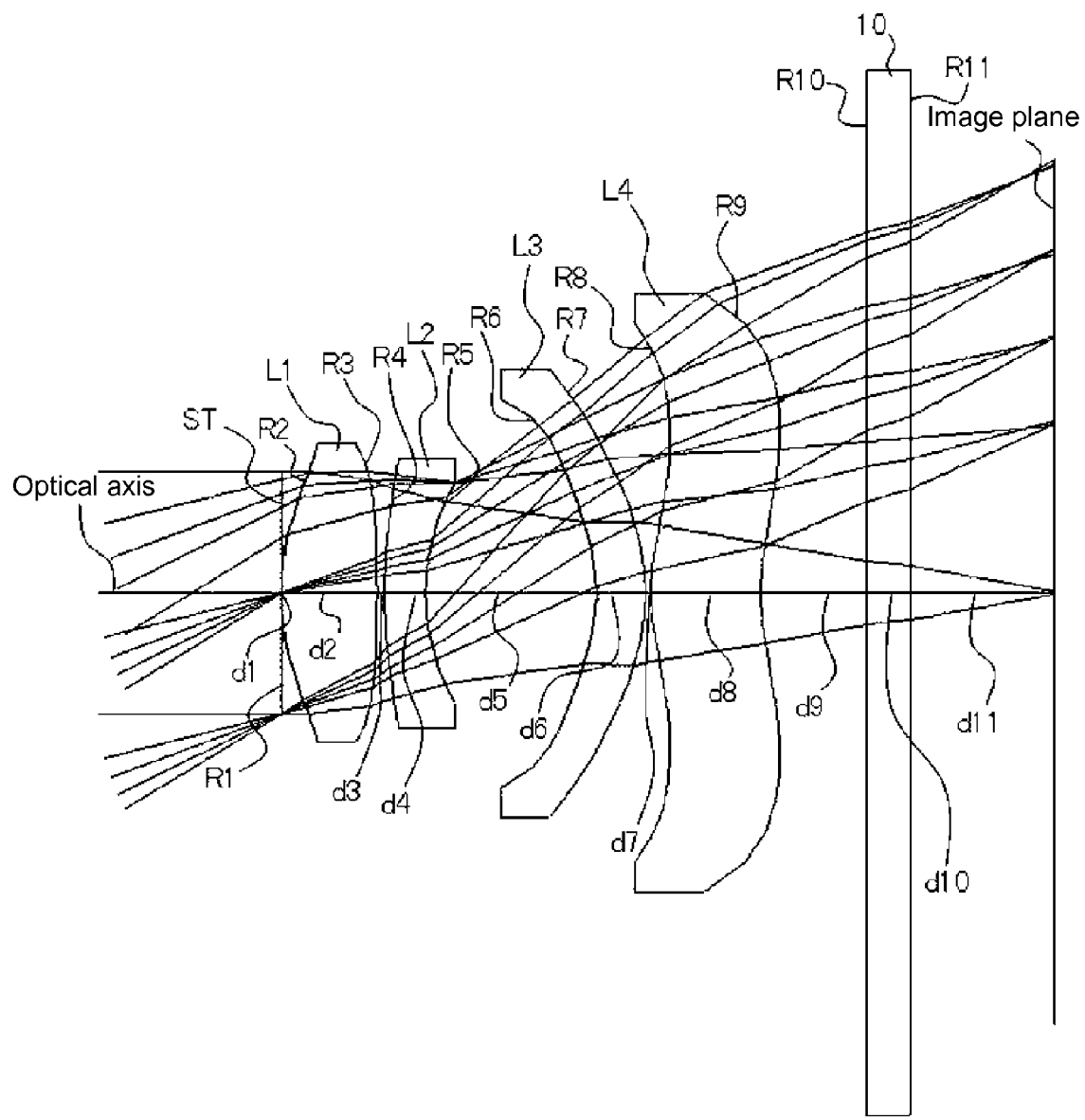
FIG. 10 is a schematic sectional view showing a configuration of an imaging lens in Numerical Data Example 4 according to a second embodiment of the invention.

FIG. 10 shows a sectional structure of an imaging lens of Numerical Data Example 4, which is a numerical data example of this embodiment. As shown in FIG. 10, the imaging lens of this embodiment has an aperture stop ST; a first lens L1 having positive refractive power; a second lens L2 having negative refractive power; a third lens L3 having negative refractive power; and a fourth lens L4 having positive refractive power arranged in this order from an object side to an image plane side. A cover glass 10 is provided between the fourth lens L4 and the image plane. In addition, also in this embodiment, the aperture stop is provided on a tangential plane of a vertex of an object-side surface of the first lens L1.

In the imaging lens having the above-described configuration, the first lens L1 is formed in a shape so that a curvature radius R2 of an object-side surface thereof is positive and a curvature radius R3 of an image-side surface thereof is negative, i.e. a shape of a biconvex lens near the optical axis. The second lens L2 is formed in a shape so that a curvature radius R4 of an object-side surface thereof and a curvature radius R5 of an image-side surface thereof are both positive and has a shape of a meniscus lens directing a convex surface thereof to the object side near the optical axis.

The third lens L3 is formed in a shape so that a curvature radius R6 of an object-side surface thereof and a curvature radius R7 of an image-side surface thereof are both negative, and has a shape of a meniscus lens directing a concave surface thereof to the object side near the optical axis. The fourth lens L4 is formed in a shape so that a curvature radius R8 of an object-side surface thereof and a curvature radius R9 of an image-side surface thereof are both positive, and has a shape of a meniscus lens directing a convex surface thereof to the object side near the optical axis.

Furthermore, the image-side surface of the fourth lens L4 is formed as an aspheric shape so as to have a convex shape on the object side near the optical axis and a concave shape on the object side in the periphery. With such shape of the fourth lens L4, it is possible to suitably restrain an incident angle of a light beam emitted from the imaging lens to an image plane.

Here, according to the imaging lens of this embodiment, similarly to the imaging lens of the above-described first embodiment, the material of the first lens L1 and the material of the fourth lens L4 are same.

The imaging lens of this embodiment satisfies the following conditional expressions (1) to (3) and (3A):

$$0.5 < L14/f < 0.8 \quad (1)$$

$$0.3 < d23/L24 < 0.7 \quad (2)$$

$$0.1 < f12/f34 < 0.8 \quad (3)$$

$$0.2 < f12/f34 < 0.6 \quad (3A)$$

In the above conditional expressions,
f: Focal length of a whole lens system
L14: Distance on an optical axis from an object-side surface of a first lens L1 to an image-side surface of a fourth lens L4
d23: Distance on the optical axis from an image-side surface of a second lens L2 to an object-side surface of a third lens L3
L24: Distance on the optical axis from an object-side surface of the second lens L2 to an image-side surface of the fourth lens L4
f12: Composite focal length of the first lens L1 and the second lens L2
f34: Composite focal length of the third lens L3 and the fourth lens L4

In addition, similarly to the above-described first embodiment, the imaging lens of this embodiment satisfies the following conditional expressions (4) to (7) in addition to the aforementioned conditional expressions (1) to (3) and (3A):

$$vd1 > 50 \quad (4)$$

$$vd2 < 30 \quad (5)$$

$$|vd1 - vd4| < 10 \quad (6)$$

$$|vd2 - vd3| < 10 \quad (7)$$

Here, it is not necessary to satisfy all of the conditional expressions (1) to (7). When any single one of the conditional expressions is individually satisfied, it is possible to obtain an effect corresponding to the respective conditional expression.

Next, Numerical Data Example of the imaging lens of the embodiment will be described. In the Numerical Data Example, f represents a focal length of a whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line, and νd represents Abbe's number for the d line, respectively. Here, aspheric surfaces are indicated with surface numbers i affixed with * (asterisk).

The values of the respective conditional expressions are as follows:
L14/f=0.707
d23/L24=0.453
f12/f34=0.318
νd1=56.2
νd2=26.0
|νd1−νd4|=0
|νd2−νd3|=0

Therefore, the imaging lens in Numerical Data Example 4 satisfies the respective conditional expressions (1) to (7).

Numerical Data Example 4

Basic lens data are shown below.
f = 4.533 mm, Fno = 2.800, ω = 32.36°
Unit: mm
Surface Data

| Surface Number i | R | d | Nd | νd |
|---|---|---|---|---|
| (Object) | ∞ | ∞ | | |
| 1 (Stop) | ∞ | 0.0000 | | |
| 2* | 1.750 | 0.6400 | 1.52470 | 56.2(=νd1) |
| 3* | −7.580 | 0.0500 | | |
| 4* | 2.980 | 0.2750 | 1.61420 | 26.0(=νd2) |
| 5* | 1.340 | 1.1400(=d23) | | |
| 6* | −1.080 | 0.3300 | 1.61420 | 26.0(=νd3) |
| 7* | −1.460 | 0.0300 | | |
| 8* | 1.340 | 0.7400 | 1.52470 | 56.2(=νd4) |
| 9* | 1.790 | 0.7000 | | |
| 10 | ∞ | 0.3000 | 1.51633 | 64.12 |
| 11 | ∞ | 0.9590 | | |
| (Image plane) | ∞ | | | | f12 = 5.368
f34 = 16.859
L14 = 3.205
L24 = 2.515

Aspheric Surface Data $k = 6.786206E{-}01$, $A_4 = -2.452177E{-}02$, $A_6 = -4.531117E{-}02$, $A_8 = 1.799352E{-}02$,
$A_{10} = -4.777095E{-}02$
Third Surface $k = -5.729004E{+}02$, $A_4 = -9.783542E{-}02$, $A_6 = 3.888487E{-}04$, $A_8 = 4.415689E{-}02$,
$A_{10} = -5.564102E{-}02$
Fourth Surface $k = 0.000000$, $A_4 = -7.770589E{-}02$, $A_6 = -1.491525E{-}01$, $A_8 = 2.686134E{-}01$,
$A_{10} = 1.252068E{-}01$, $A_{12} = -5.138390E{-}01$, $A_{14} = 3.257669E{-}01$
Fifth Surface $k = -3.783573$, $A_4 = 6.655314E{-}02$, $A_6 = -2.019505E{-}03$, $A_8 = -5.264757E{-}02$,
$A_{10} = -9.946107E{-}02$, $A_{12} = 9.168460E{-}01$, $A_{14} = -9.366545E{-}01$
Sixth Surface $k = -7.739841$, $A_4 = -2.600109E{-}02$, $A_6 = -2.781476E{-}02$, $A_8 = 1.721137E{-}02$,
$A_{10} = -6.618718E{-}03$, $A_{12} = -1.020692E{-}03$, $A_{14} = 3.566882E{-}03$, $A_{16} = -3.501108E{-}03$
Seventh Surface $k = -3.257123E{-}01$, $A_4 = 6.651450E{-}02$, $A_6 = 5.551070E{-}03$, $A_8 = 2.372390E{-}04$,
$A_{10} = 1.073662E{-}03$, $A_{12} = -1.401114E{-}03$, $A_{14} = -6.211786E{-}04$, $A_{16} = 3.980215E{-}04$
Eighth Surface $k = -1.115632E{+}01$, $A_4 = -1.152918E{-}01$, $A_6 = 3.977347E{-}02$, $A_8 = -1.926234E{-}03$,
$A_{10} = -2.682682E{-}03$, $A_{12} = 4.506907E{-}05$, $A_{14} = 1.366224E{-}04$, $A_{16} = -7.319281E{-}06$
Ninth Surface $k = -7.835931$, $A_4 = -9.770814E{-}02$, $A_6 = 2.656391E{-}02$, $A_8 = -3.951961E{-}03$,
$A_{10} = -3.034931E{-}04$, $A_{12} = 3.770115E{-}05$, $A_{14} = 3.157577E{-}05$, $A_{16} = -6.376041E{-}06$ Furthermore, the imaging lens of this Numerical Data Example 4 further satisfies the following conditional expressions (8) and (9), so as to more satisfactorily correct the chromatic aberrations.

$$vd1=vd4 \quad (8)$$

$$vd2=vd3 \quad (9)$$

Furthermore, in the imaging lens of Numerical Data Example 4, since the material of the second lens L2 and the material of the third lens L3 are same, the number of types of the materials is only two, so that it is possible to further reduce the manufacturing cost of the imaging lens.

Figure 11:
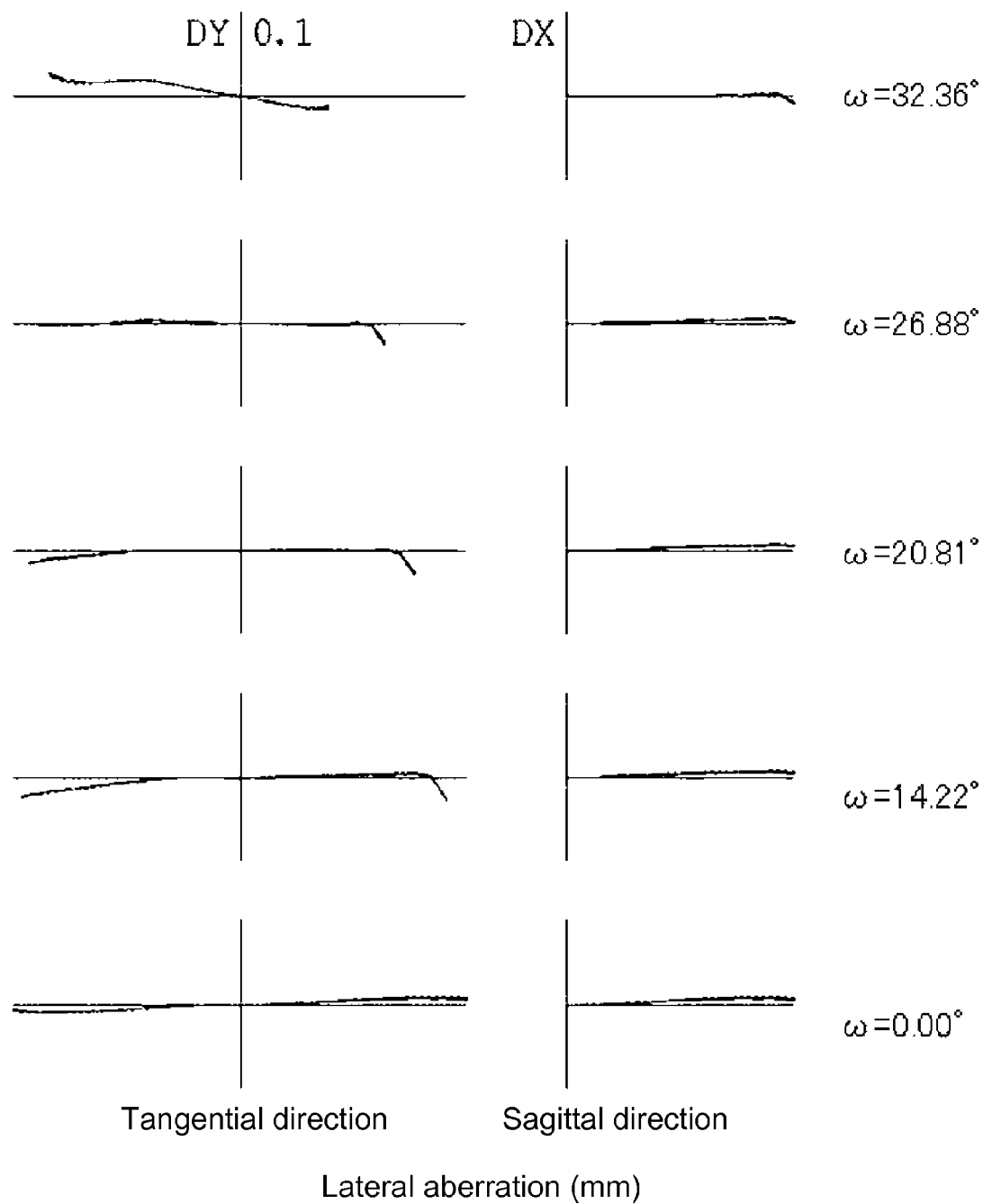
FIG. 11 is an aberration diagram showing a lateral aberration of the imaging lens of Numerical Data Example 4.
Figure 12:
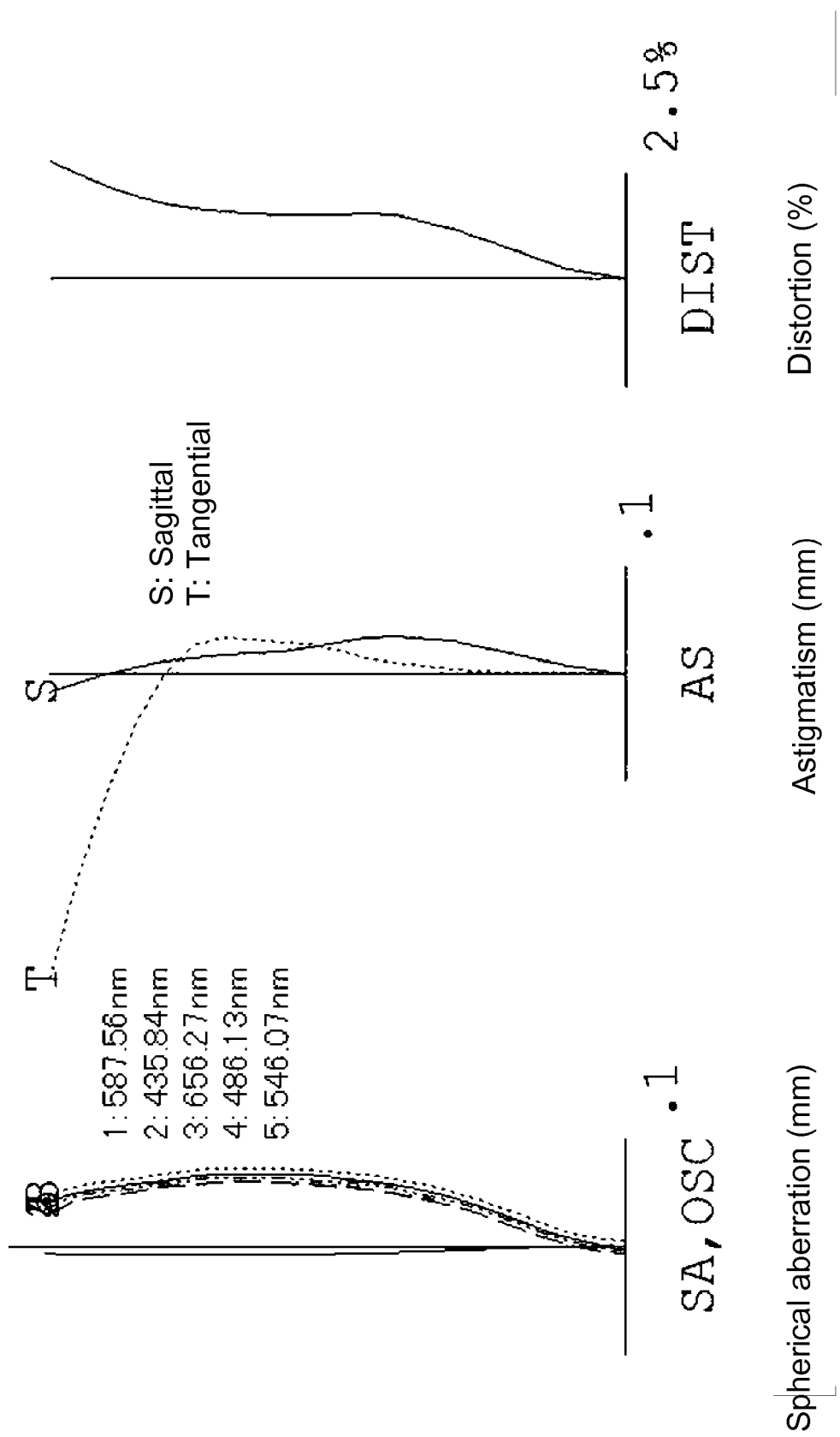
FIG. 12 is an aberration diagram showing a spherical aberration, an astigmatism, and a distortion of the imaging lens of Numerical Data Example 4.

FIG. 11 shows the lateral aberration that corresponds to a half angle of view ω in the imaging lens of Numerical Data Example 4 by dividing into a tangential direction and sagittal direction. Furthermore, FIG. 12 shows a spherical aberration SA (mm), an astigmatism AS (mm), and a distortion DIST (%) of the imaging lens of Numerical Data Example 4, respectively. In the aberration diagrams, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagram, the aberration on the sagittal image surface S and the aberration on tangential image surface T are respectively indicated. As shown in FIGS. 11 and 12, in the imaging lens of Numerical Data Example 4, each aberration is satisfactorily corrected similarly to the imaging lens of the above-described first embodiment.

According to the imaging lens of this embodiment, any lens is made of a plastic lens material. Conventionally, it is usual to form the first lens, which has high refractive power, from a glass material. A glass material, however, increases the total manufacturing cost to form a lens in comparison with a case of using a plastic material, so that there still remains a challenge in reducing the manufacturing cost of the imaging lens. According to the imaging lens of this embodiment, since any lens is made of a plastic material, it is possible to suitably reduce the manufacturing cost.

Accordingly, when the imaging lens of the respective embodiments are applied to an imaging optical system of a cellular phone, a digital still camera, a portable information terminal, a security camera, a vehicle onboard camera, a network camera, and the like, it is possible to attain both high performances and miniaturization of such cameras.

The invention may be applicable to the imaging lens for mounting in a device that requires the imaging lens to attain miniaturization and satisfactory aberration correcting performances, for example, a cellular phone or a digital still camera.

What is claimed is:

1. An imaging lens comprising:
a first lens having positive refractive power;
a second lens having negative refractive power;
a third lens having positive refractive power; and
a fourth lens having positive refractive power, arranged in this order from an object side to an image plane side,
wherein said first lens is formed in a shape so that a curvature radius of a surface thereof on the object side is positive and a curvature radius of a surface thereof on the image plane side is negative,
said second lens is formed in a shape so that a curvature radius of a surface thereof on the object side and a curvature radius of a surface thereof on the image plane side are both positive,
said third lens is formed in a shape so that a curvature radius of a surface thereof on the object side and a curvature radius of a surface thereof on the image plane side are both negative, and
said first lens has the surface on the object side away from a surface of the fourth lens on the image plane side by a distance L14 on an optical axis and an Abbe's number vd1, said second lens has an Abbe's number vd2, said third lens has an Abbe's number vd3, and said fourth lens has an Abbe's number vd4 so that the following expressions are satisfied:

$$0.5<L14/f<0.8$$

$$|vd1-vd4|<10$$

$$|vd2-vd3|<10$$

where f is a focal length of a whole lens system.

2. The imaging lens according to claim 1, wherein said first lens has the Abbe's number vd1, said second lens has the Abbe's number vd2, said third lens has the Abbe's number vd3, and said fourth lens has the Abbe's number vd4 so that the following expressions are satisfied:

$$vd1=vd4$$

$$vd2=vd3.$$

3. An imaging lens comprising:
a first lens having positive refractive power;
a second lens having negative refractive power;
a third lens having negative refractive power; and
a fourth lens having positive refractive power, arranged in this order from an object side to an image plane side,
wherein said first lens is formed in a shape so that a curvature radius of a surface thereof on the object side is positive and a curvature radius of a surface thereof on the image plane side is negative,
said second lens is formed in a shape so that a curvature radius of a surface thereof on the object side and a curvature radius of a surface thereof on the image plane side are both positive,
said third lens is formed in a shape so that a curvature radius of a surface thereof on the object side and a curvature radius of a surface thereof on the image plane side are both negative, and
said first lens has the surface on the object side away from a surface of the fourth lens on the image plane side by a distance L14 on an optical axis so that the following expression is satisfied:

$$0.5<L14/f<0.8$$

where f is a focal length of a whole lens system.

4. The imaging lens according to claim 3, wherein said second lens has the surface on the image plane side away from the surface of the third lens on the object side by a distance d23 on the optical axis, and said second lens has the surface on the object side from the surface of the fourth lens on the image plane side by a distance L24 on the optical axis so that the following expression is satisfied:

$$0.3<d23/L24<0.7.$$

5. The imaging lens according to claim 3, wherein said first lens and said second lens have a composite focal length f12, and said third lens and said fourth lens have a composite focal length f34 so that the following expression is satisfied:

$$0.1<f12/f34<0.8.$$

6. The imaging lens according to claim 3, wherein said first lens has an Abbe's number vd1 and said second lens has an Abbe's number vd2 so that the following expressions are satisfied:

$$vd1 > 50$$

$$vd2 < 30.$$

7. The imaging lens according to claim 3, wherein said first lens has the Abbe's number vd1, said second lens has the Abbe's number vd2, said third lens has an Abbe's number vd3 and said fourth lens has an Abbe's number vd4 so that the following expressions are satisfied:

$$|vd1 - vd4| < 10$$

$$|vd2 - vd3| < 10.$$

8. The imaging lens according to claim 7, wherein said first lens has the Abbe's number vd1, said second lens has the Abbe's number vd2, said third lens has the Abbe's number vd3, and said fourth lens has the Abbe's number vd4 so that the following expressions are satisfied:

$$vd1 = vd4$$

$$vd2 = vd3.$$

* * * * *

UNITED STATES PATENT AND TRADEMARK OFFICE
CERTIFICATE OF CORRECTION

PATENT NO.       : 8,477,434 B2                                  Page 1 of 1
APPLICATION NO.  : 13/445154
DATED            : July 2, 2013
INVENTOR(S)      : Yoji Kubota et al.

It is certified that error appears in the above-identified patent and that said Letters Patent is hereby corrected as shown below:

In the Title page, item (73), Assignee: add --Kantatsu Co., Ltd., Tochigi (JP)--.

Signed and Sealed this
Eighth Day of October, 2013

Teresa Stanek Rea
*Deputy Director of the United States Patent and Trademark Office*